(12) United States Patent
Bush

(10) Patent No.: US 6,612,540 B2
(45) Date of Patent: Sep. 2, 2003

(54) RETROFIT FOR MECHANICAL COMBINATION PLUMBING FIXTURE

(75) Inventor: Shawn D. Bush, Seminole County, FL (US)

(73) Assignee: I-Con Systems, Inc., Oviedo, FL (US)

( * ) Notice: Subject to any disclaimer, the term of this patent is extended or adjusted under 35 U.S.C. 154(b) by 27 days.

(21) Appl. No.: 10/037,676

(22) Filed: Jan. 3, 2002

(65) Prior Publication Data

US 2003/0122096 A1 Jul. 3, 2003

(51) Int. Cl.$^7$ ................................................ F16K 31/06
(52) U.S. Cl. ............................ 251/129.01; 251/129.04; 251/149.9
(58) Field of Search ............ 251/149.9, 129.01–129.22; 137/315.03

(56) References Cited

U.S. PATENT DOCUMENTS

| 4,593,881 A | * | 6/1986 | Yoshino | 251/129.11 |
| 4,905,960 A | * | 3/1990 | Barnhart | 251/129.18 |
| 4,971,287 A | | 11/1990 | Shaw | 251/30.05 |
| 5,069,420 A | * | 12/1991 | Stobbs et al. | 251/129.08 |
| 5,213,303 A | * | 5/1993 | Walker | 251/129.17 |
| 5,575,311 A | * | 11/1996 | Kingsford | 251/129.17 |

* cited by examiner

Primary Examiner—Paul J. Hirsch
(74) Attorney, Agent, or Firm—Webb Ziesenheim Logsdon Orkin & Hanson, P.C.

(57) ABSTRACT

The present invention is a control valve having an adapter element, which is particularly useful as a retrofit for a mechanical flow valve. The adapter element has at least one adapter element fluid inlet and at least one adapter element fluid outlet and is sealingly engaged with and in fluid communication with a flow valve. The flow valve has a flow valve fluid inlet, a flow valve fluid outlet, and a flow valve piston orifice. The adapter element includes a piston orifice plug extension to seal the flow valve piston orifice when the adapter element is engaged with the flow valve. The control valve also includes a plunger mechanism with a plunger element in operable communication with the adapter element fluid outlet. The adapter element is a unitary structure.

16 Claims, 2 Drawing Sheets

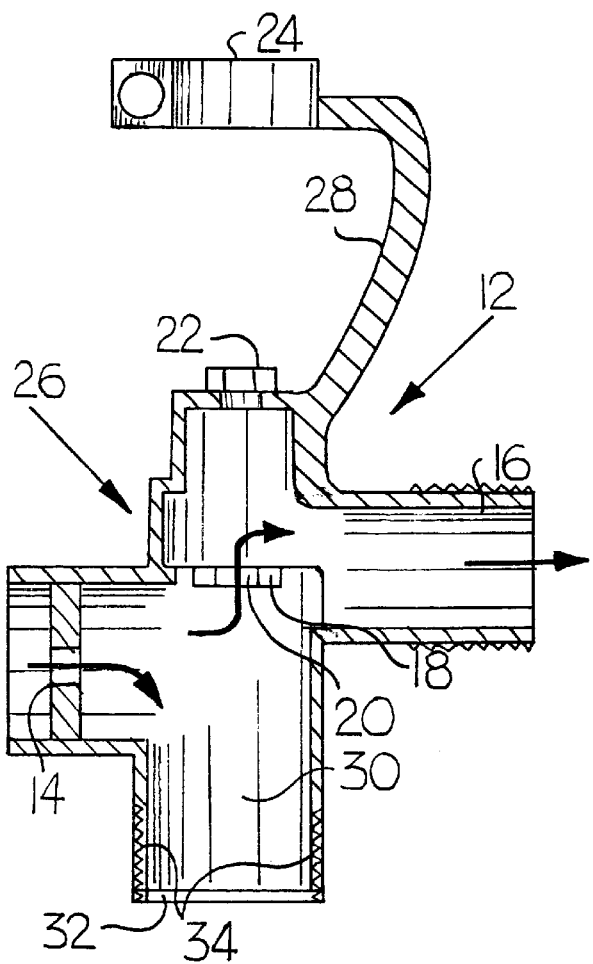
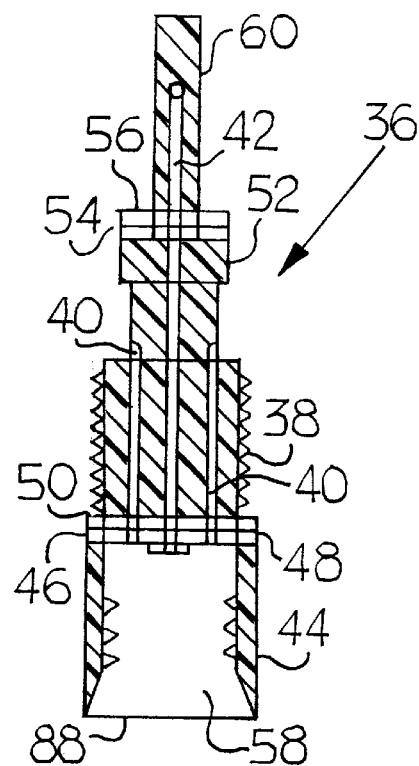
Fig. 1 PRIOR ART
Fig. 2
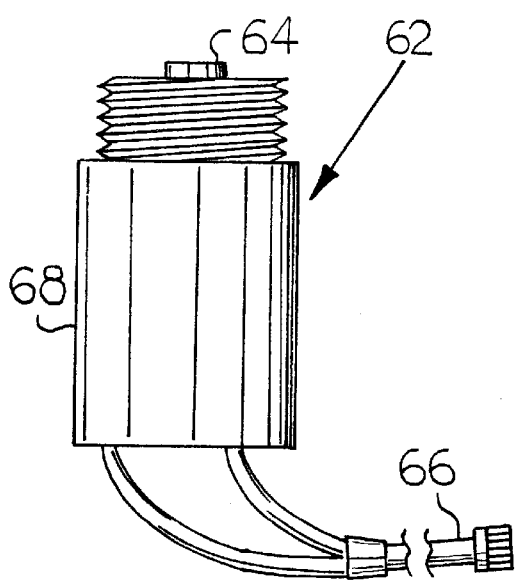
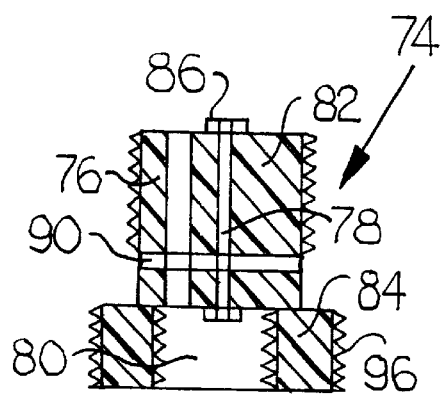
Fig. 3
Fig. 4

RETROFIT FOR MECHANICAL COMBINATION PLUMBING FIXTURE

BACKGROUND OF THE INVENTION

1. Field of the Invention

The present invention relates generally to control valves, and, in particular, to control valves for use in connection with electronically-triggered flow valves and fluid control systems.

2. Brief Description of the Prior Art

In most fluid control systems, and more particularly, water conduit systems, control valves are utilized to control the flow of water through the piping system. Such control valves are commonly used in connection with electronic control centers, which contain sensor inputs to register a user's request for operation of the flow valve. It is these valves, typically solenoid-operated valves that control the flow of water to the user. Such control valves have recently found great use in prison lavatory and water closet systems.

In the area of prison lavatory and water closet systems, there is a need for a method and apparatus for converting and controlling manually-operated prison lavatory flow valves, in particular, piston valves, which are operated by a user by depressing an external button connected to a rod. The rod is further connected to a lever on the mechanical valve. First and second chambers are separated by a flexible diaphragm or a piston, including O-ring seals. As the first chamber is filled by water, as supplied by the water inlet, the second chamber is filled by a tiny metering hole in the diaphragm or piston. The water outlet is connected to a lavatory spout or similar fixture. A tiny metering hole is the source that determines the time duration of the fluid flow. As the user depresses the button, the motion is communicated to the associated rod, and further moves a lever on the mechanical valve. As this lever is moved, the second chamber is relieved of the stored fluid, thus reducing the force holding the diaphragm or piston in the "off" position. The reduced force allows the first chamber to raise the flexible diaphragm or the piston, thereby disturbing the seal and further allowing fluid flow to occur through the outlet. The fluid flow continues as the first chamber fills the second chamber through the tiny metering hole. After the second chamber is filled, the diaphragm or piston is lowered into the original position and fluid flow stops.

The diaphragm, or, in the case of a piston flow valve, the piston, and the metering hole are required for the selected length of fluid flowing for the prisoner to wash hands, receive a drink, receive a shower, and the like. Due to the impurities in potable water, the tiny metering hole will often clog or be altered in size, causing the length of time to be insufficient or the length of time to be further extended, wasting water. This piston flow valve, and control valves associated with these types of flow valves, have numerous and separately functioning pieces. The assembly, maintenance, and repair of such a valve having many pieces is difficult, expensive, and time-consuming.

SUMMARY OF THE INVENTION

It is, therefore, an object of the present invention to provide a control valve having a minimum number of "pieces," thereby reducing expense and maintenance cost. It is another object of the present invention to provide a control valve, which is simple in its installation and easy in its repair. It is a further object of the present invention to provide a control valve that does not require any significant plumbing alterations prior to its installation. It is a further object of the present invention to provide a control valve that is particularly adapted to retrofitting a piston flow valve.

Accordingly, the present invention is directed to a control valve that includes an adapter element having at least one adapter element fluid inlet and at least one adapter element fluid outlet. This adapter element is sealingly engaged with and in fluid communication with a piston flow valve. The piston flow valve, typically already present in the system, includes a piston flow valve fluid inlet and a piston flow valve fluid outlet. The control valve also includes a plunger mechanism sealingly engaged with and in fluid communication with the adapter element. The plunger mechanism has a plunger element in operable communication with the adapter element fluid outlet, such that the plunger mechanism may allow and disallow fluid flow through the adapter element fluid outlet. Further, the adapter element of the control valve is a unitary structure, consisting of only one unitary piece.

The present invention, both as to its construction and its method of operation, together with the additional objects and advantages thereof, will best be understood from the following description of specific embodiments when read in connection with the accompanying drawings.

BRIEF DESCRIPTION OF THE DRAWINGS

FIG. 1 is a side sectional view of a typical prior art piston flow valve;

FIG. 2 is a side sectional view of an adapter element of the control valve according to the present invention;

FIG. 3 is a side view of a plunger mechanism of the control valve according to the present invention;

FIG. 4 is a side sectional view of an adapter fitting of the control valve according to the present invention.

DETAILED DESCRIPTION OF THE PREFERRED EMBODIMENTS

Figure 5:
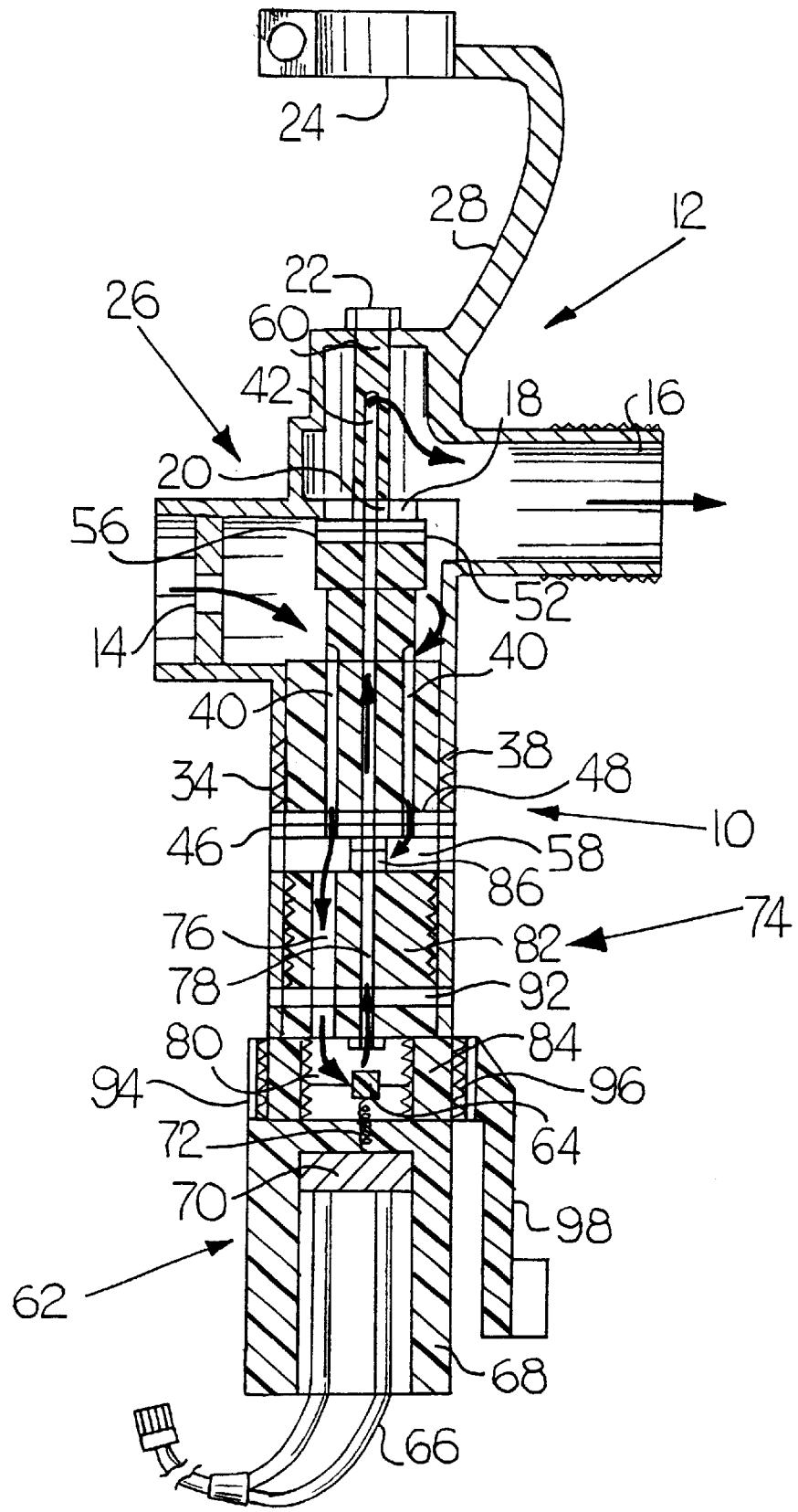
FIG. 5 is a side sectional view of a preferred embodiment of a control valve of the present invention as attached to a typical prior art piston flow valve.

The present invention is a control valve 10 for use in connection with a flow valve 12. The flow valve 12 is of a type and variety that is commonly used in fluid piping systems and is illustrated in FIG. 1. Specifically, the flow valve 12 has a flow valve fluid inlet 14 and a flow valve fluid outlet 16. Flow valve fluid inlet 14 is adapted for fluid communication with a water supply source, while flow valve fluid outlet 16 is adapted for fluid communication with a fixture, such as a faucet on a sink. Further, the flow valve 12 has a flow valve rim 18 having a flow valve rim fluid outlet 20 extending therethrough. The flow valve 12 also has a flow valve piston orifice 22, which is configured to accept a piston element (not shown). In a typical operation, a piston (not shown) extends from a user-operated button, through a flow valve sleeve 24 and through the flow valve piston orifice 22 and to the piston flow valve rim fluid outlet 20. The flow valve sleeve 24 is connected to a flow valve main body 26 by a flow valve connector 28.

The flow valve 12 further includes a flow valve chamber 30 having a flow valve chamber groove 32. The flow valve chamber groove 32 is particularly adapted to receive an appropriately sized O-ring. Finally, the flow valve chamber 30 has inner walls with flow valve threads 34 disposed thereon. In operation, appropriate piping may be connected to the flow valve fluid inlet 14 and the flow valve fluid outlet 16, while the flow valve threads 34 are used for connection with a conventional control valve, as is known in the art.

In particular, a conventional fluid control valve may be provided within flow valve chamber 30 through threaded engagement with flow valve threads 34. Such a conventional flow control valve includes mechanical means for regulating the flow of water through flow valve 12 from flow valve inlet 14 to flow valve outlet 16. Such a fluid control valve may be a diaphragm-type valve, where the opening and closing of the valve is regulated by the pressure exerted on the elastomeric diaphragm by the water within the valve. Activation of such a conventional valve is accomplished through mechanical activation of a piston element, which releases the water from one chamber and therefore releases the pressure on the diaphragm. Such mechanical valves are well known in the art. The control valve 10 of the present invention is designed as a retrofit valve to replace the conventional fluid control valve within such a flow valve, for electronic control. Through the use of such a retrofit valve, the conventional flow valve 12 can easily be converted to electronic operation without the need for extensive plumbing reconfiguration.

The control valve 10 includes an adapter element 36, as seen in FIG. 2. The adapter element 36 is a substantially tubular-shaped element, which is adapted for attachment to the above-described flow valve 12. However, it is envisioned that the adapter element 36 can be manufactured in any shape that corresponds to a differently-shaped flow valve 12 or diaphragm flow valve (not shown). The adapter element 36 includes adapter element outer wall threads 38, which are adapted to mate with the flow valve threads 34, thereby engaging the adapter element 36 with the flow valve 12. In this manner, the adapter element 36 is secured to the flow valve 12.

The adapter element 36 includes at least one adapter element fluid inlet 40 and at least one adapter element fluid outlet 42. When attached to the flow valve 12, the adapter element fluid inlet 40 is in fluid communication with the flow valve fluid inlet 14, such that fluid, typically water, may flow through the flow valve fluid inlet 14 and further through the adapter element fluid inlet 40. Similarly, the adapter element fluid outlet 42 is in fluid communication with the flow valve fluid outlet 16, thereby allowing flow through the adapter element fluid outlet 42 and through the flow valve fluid outlet 16 into the downstream piping.

The adapter element 36 has an adapter element base 44, and the adapter element base 44 has an adapter element base upper ledge 46. The adapter element base upper ledge 46 is adapted to mate with the corresponding piston flow valve chamber groove 32. The adapter element base upper ledge 46 may also include an adapter element base upper ledge groove 48 configured to accept a first O-ring 50, such that when the adapter element 36 is mated with flow valve 12, the adapter element base upper ledge 46 engages with the corresponding flow valve chamber groove 32, with the first O-ring 50 providing a water-tight seal at the juncture.

In order to continue the sealed fluid passage of water, the adapter element 36 also includes an adapter element rim 52 adapted to seal against the flow valve rim 18. As with the adapter element base upper ledge 46, the adapter element rim 52 may also include an adapter element rim groove 54 configured to accept a second O-ring 56 therein. When the adapter element 36 is attached to the flow valve 12, the second O-ring 56 provides a water-tight seal between the adapter element rim 52 and the flow valve rim 18. This watertight seal ensures that water will flow through the flow valve fluid inlet 14 through the adapter element fluid inlet 40 and, eventually, through the adapter element fluid outlet 42 and through the flow valve fluid outlet 16 to the downstream piping.

As seen in FIG. 2, the adapter element 36 includes an adapter element chamber 58 extending partially into the adapter element 36. The adapter element chamber 58 is in fluid communication with the adapter element fluid inlet 40, as well as the adapter element fluid outlet 42. Further, in the preferred embodiment, the adapter element 36 has multiple adapter element fluid inlets 40 for increased fluid flow.

In order to allow for a proper retrofit of the control valve 10 to the flow valve 12, the adapter element 36 also includes an adapter element piston orifice plug extension 60, which is configured to seal the flow valve piston orifice 22 on the flow valve 12 when the adapter element 36 is engaged with the flow valve 12. The adapter element piston orifice plug extension 60 seals the flow valve piston orifice 22, thereby preventing any fluid flow out of piston orifice 22 of the flow valve 12. In addition, it is this adapter element piston orifice plug extension 60 that allows the control valve 10 to be used in conjunction with and retrofitted for the prior art flow valve 12, which used a piston or rod to control valve operation, as described above. Further, the adapter element fluid outlet 42 extends partially through and out of the adapter element piston orifice plug extension 60, allowing flow through the adapter element fluid outlet 42 and to a position adjacent flow valve fluid outlet 16.

As seen in FIG. 3, the control valve 10 also includes a plunger mechanism 62 having a plunger element 64. Plunger mechanism 62 is desirably an electrically-operated solenoid, as is known for use in cooperation with electronically-operated fixtures. The plunger element 64 is in operable communication with the adapter element fluid outlet 42. Whether directly or indirectly in contact with the adapter element fluid outlet 42, the plunger element 64 serves to permit or prevent fluid communication between adapter element fluid inlet 40 and adapter element fluid outlet 42. In the preferred embodiment, the operable movement of the plunger element 64 is attained through a signal, which travels from a control center (not shown) through a plunger mechanism communication line 66, which is in communication with the plunger element 64. In addition, this plunger mechanism communication line 66 is at least partially encased in a plunger mechanism body 68, which is used to house the plunger mechanism 62 inner workings.

In operation, when the plunger element 64 is disengaged (i.e., no signal is emanating from the plunger mechanism communication line 66) the plunger element 64 is fully extended and blocks the adapter element fluid outlet 42. As such, when fluid enters the flow valve fluid inlet 14, fluid flows through the adapter element fluid inlet 40 and enters the adapter element chamber 58. The plunger element 64 blocks any flow through the adapter element fluid outlet 42 and, therefore, the flow valve fluid outlet 16. In this manner, no fluid exits the flow valve 12.

When an appropriate signal is sent through the plunger mechanism communication line 66, the plunger element 64 retracts, and allows fluid flow from the adapter element chamber 58 through the adapter element fluid outlet 42 and, in turn, through the flow valve fluid outlet 16. Fluid flow continues for the duration of retraction of plunger element 64. For example, plunger element 64 may remain retracted for a predetermined time period, or may remain retracted for as long as the appropriate signal continues to travel through the plunger mechanism communication line 66. However, once the signal ceases, the plunger element 64 again extends and blocks the adapter element fluid outlet 42, halting fluid flow once more.

In a preferred embodiment, the plunger mechanism 62 includes a magnetic element 70 and a bias spring 72. The bias spring 72 urges the plunger element 64 to extend away from the plunger mechanism body 68. In this embodiment, when an appropriate signal is received through the plunger mechanism communication line 66, the magnetic element 70 is charged with enough of a magnetic field to overcome the bias spring 72 urge thereby retracting the plunger element 64. As discussed above, when the signal ceases, the magnetic element 70 also ceases to have a magnetic field capable of overcoming the bias spring 72 urge. Therefore, the bias spring 72 once again urges the plunger element 64 to extend and block the adapter element fluid outlet 42.

Importantly, the adapter element 36 is manufactured as a unitary structure. For example, the adapter element 36 may be manufactured from an injection mold process utilizing a polymeric material. The unitary structure of the adapter element 36 is particularly desirable in that it does not require numerous smaller pieces in order to appropriately function. This is particularly advantageous in installing the control valve 10 or in maintaining it. Further, in a retrofit situation, the unitary structure of the adapter element 36 provides a simple combination of fluid control, together with the blockage of any flow through the flow valve piston orifice 22.

In another preferred embodiment, the control valve 10 also includes an adapter fitting 74 having at least one adapter fitting fluid inlet 76 and at least one adapter fitting fluid outlet 78. The adapter fitting 74 is configured to sealingly engage the adapter element 36 within chamber 58. In addition, the adapter fitting fluid inlet 76 is in fluid communication with the adapter element fluid inlet 40, and, likewise, the adapter fitting fluid outlet 78 is in fluid communication with the adapter element fluid outlet 42. This adapter fitting 74 provides an easy manner in which to attach the plunger mechanism 62 to the adapter element 36, yet still allow all of the fluid inlets and fluid outlets to communicate.

The adapter fitting 74, like the adapter element 36, has an adapter fitting chamber 80, which is in fluid communication with both the adapter fitting fluid inlet 76 and the adapter fitting fluid outlet 78. However, when using the adapter fitting 74 in connection with the adapter element 36, the plunger element 64 of the plunger mechanism 62, while in operable communication with the adapter element fluid outlet 42, directly seals against the adapter fitting fluid outlet 78. In this case, since the adapter fitting fluid outlet 78 is in fluid communication with the adapter element fluid outlet 42, when the plunger element 64 engages the adapter fitting fluid outlet 78, flow is prevented through the remaining fluid outlet passageways. Additionally, when using the adapter fitting 74, the plunger mechanism 62 is inserted into and attached to the adapter fitting 74 via the adapter fitting chamber 80.

The adapter fitting 74 also includes an adapter fitting body 82, an adapter fitting rim 84, and an adapter fitting ledge 86. In use, the adapter fitting body 82 is inserted into the adapter element chamber 58, such that the adapter fitting ledge 86 provides a direct and sealed fluid path through the adapter fitting fluid outlet 78 and into the adapter element fluid outlet 42. Further, the adapter fitting rim 84 extends below and abuts an adapter element base 88.

Regardless of the order in which they are attached, the flow valve 12, adapter element 36, adapter fitting 74, and plunger mechanism 62 are connected in series such that fluid flow is continuous through all of the fluid passageways, with the plunger element 64 preventing fluid communication between the fluid inlets and the fluid outlets. It is also envisioned that the adapter fitting 74 includes an adapter fitting groove 90 adapted to accept a third O-ring 92. When the adapter fitting 74 is inserted into the adapter element chamber 58, the third O-ring 92 ensures a watertight seal between the adapter fitting 74 and the adapter element chamber 58.

The control valve 10 may also include a release mechanism 94. This release mechanism 94 is typically used in connection with the adapter fitting 74, and is engaged with an adapter fitting rim outer surface 96 such as through corresponding threaded engagement. The release mechanism 94 is attached to the adapter fitting rim outer surface 96, preferably in a nonpermanent manner. Further, the release mechanism 94 has a release mechanism handle 98 to further assist in removing the adapter fitting 74 from the adapter element chamber 58 and/or from the plunger mechanism 62. In a preferred embodiment, the release mechanism 94 is manufactured in a tubular shape having an inner surface that is frictionally engagable with the adapter fitting rim outer surface 96. In operation, one need only rotate the release mechanism handle 98, and, due to the engagement between the release mechanism 94 and the adapter fitting rim 84, the entire adapter fitting 74 may be unthreaded from the adapter element 36. Release mechanism 94 provides a manual override feature to control valve 10. For example, when assembled, control valve 10 includes plunger mechanism 62 in a closed position, preventing fluid communication between the inlets and the outlets. Release mechanism 94 provides a simple device for manually releasing the attachment between adapter fitting 74 and plunger mechanism 62, by unscrewing adapter fitting 74 from plunger mechanism 62 through release mechanism 94, thereby releasing plunger element 64 from sealing engagement with adapter fitting fluid outlet 78, and establishing fluid communication between adapter fitting fluid inlet 76 and adapter fitting fluid outlet 78, thus permitting fluid flow through the valves. Such manual override is particularly useful during installation and troubleshooting of control valve 10. Control valve 10 can be closed by rescrewing adapter fitting 74 onto plunger mechanism 62 through release mechanism 94.

While any manner of attachment between the various elements is envisioned, it is preferable to use threaded engagements by and between all of the flow valve 12, adapter element 36, adapter fitting 74, release mechanism 94, and plunger mechanism 62. In using such a threaded engagement between the elements, control valve 10, and its various components, are easy to both install and remove from each other and from the piston flow valve 12.

As seen in FIG. 5, when using the preferred embodiment of the control valve 10, fluid flows through the flow valve fluid inlet 14, into the flow valve chamber 30, through the adapter element fluid inlets 40, into the adapter element chamber 58, through the adapter fitting fluid inlet 76 and into the adapter fitting chamber 80. In operation, a user activates a fixture such as a sink, for example, by activation of an infrared sensor on the sink. The infrared sensor sends a signal, preferably through a control unit, which in turn communicates to the solenoid-operated plunger mechanism 62 through the plunger mechanism communication line 66. The signal causes operation of the plunger mechanism 62, in which the plunger element 64 is retracted, to allow the fluid to flow through the adapter fitting fluid outlet 78, through the adapter element fluid outlet 42, and through the flow valve fluid outlet 16 into the piping system of the attached fixture, such as the faucet. When the signal stops, the plunger element 64 engages the adapter fitting fluid outlet 78, preventing any flow through the remaining fluid outlet passageways.

The present invention is simple in its use and easy in its manufacture. The unitary structure of the adapter element 36 drastically reduces both installation and maintenance time and expense. While the present invention is equally useful in new installations, it is particularly useful in retrofit situations.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A control valve for use in connection with a flow valve having a flow valve fluid inlet, a flow valve fluid outlet, and a flow valve piston orifice, the control valve comprising:
   a) an adapter element including a generally tubular unitary body comprising:
      i) a first open end comprising an adapter element chamber;
      ii) a second closed end comprising a piston orifice plug extension adapted for sealing engagement within the flow valve piston orifice of the flow valve;
      iii) at least one adapter element fluid inlet extending through the tubular body of the adapter element for establishing fluid communication between the flow valve fluid inlet and the adapter element chamber; and
      iv) at least one adapter element fluid outlet extending through the tubular body of the adapter element at the piston orifice plug extension for establishing fluid communication between the flow valve fluid outlet and the adapter element chamber; and
   b) a plunger mechanism sealingly engaged with the first open end of the adapter element within the adapter element chamber, the plunger mechanism having a plunger element in communication with the adapter element fluid outlet and being operable between an unsealed position in which fluid communication is permitted between the adapter element fluid outlet and the adapter element chamber and a sealed position in which fluid communication is prevented between the adapter element fluid outlet and the adapter element chamber.

2. The control valve of claim 1, wherein the plunger mechanism comprises a solenoid mechanism.

3. The control valve of claim 1, further comprising an adapter fitting having at least one adapter fitting fluid inlet and at least one adapter fitting fluid outlet and configured to be sealingly engaged with and in fluid communication with the adapter element chamber.

4. The control valve of claim 3, wherein the adapter fitting further comprises an adapter fitting chamber in fluid communication with the at least one adapter fitting fluid inlet and the at least one adapter fitting fluid outlet.

5. The control valve of claim 4, wherein the adapter fitting further comprises an adapter fitting O-ring groove configured to accept an O-ring, wherein the O-ring sealingly engages the inner surface of the adapter element chamber.

6. The control valve of claim 3, wherein the plunger mechanism is configured to sealingly engage the adapter fitting such that the plunger element is in operable communication with the at least one adapter fitting fluid outlet.

7. The control valve of claim 3, further comprising a release mechanism engaged with an outer surface of the adapter fitting and configured to disengage the adapter fitting from the adapter element.

8. The control valve of claim 7, wherein the release mechanism further includes a release mechanism handle.

9. The control valve of claim 1, wherein the adapter element further comprises an adapter element base having an adapter element base upper ledge configured to mate with a corresponding flow valve chamber groove on the flow valve.

10. The control valve of claim 9, wherein the adapter element base upper ledge further comprises an adapter element base upper ledge groove configured to accept an O-ring.

11. The control valve of claim 1, wherein the adapter element further comprises an adapter element rim, the piston orifice plug extension extending from the adapter element rim, the adapter element rim having an adapter element rim groove configured to accept an O-ring.

12. The control valve of claim 1, wherein the adapter element is injection molded from a polymeric material.

13. The control valve of claim 1, wherein the plunger mechanism further comprises a communication line configured to transmit a signal from an external source to the plunger mechanism.

14. The control valve of claim 1, wherein the adapter element comprises two adapter element fluid inlets oppositely spaced around an outer surface of the generally tubular body of the adapter element and extending to the adapter element chamber, the adapter element chamber in fluid communication with the adapter element fluid inlets and the at least one adapter element fluid outlet.

15. A control valve, comprising:
   an adapter element having at least one adapter element fluid inlet, at least one adapter element fluid outlet, and an adapter element chamber in fluid communication with the at least one adapter element fluid inlet and the at least one adapter element fluid outlet, the adapter element configured to be sealingly engaged with and in fluid communication with a flow valve, the piston flow valve having a flow valve fluid inlet, a flow valve fluid outlet, and a flow valve piston orifice;
   an adapter fitting having at least one adapter fitting fluid inlet and at least one adapter fitting fluid outlet and configured to be sealingly engaged with and in fluid communication with the adapter element chamber;
   a plunger mechanism sealingly engaged with and in fluid communication with the adapter element, the plunger mechanism having a plunger element in operable communication with the adapter fitting fluid outlet; and
   a release mechanism engaged with an outer surface of the adapter fitting and configured to disengage the adapter fitting from the adapter elements,
   wherein the adapter element further comprises a piston orifice plug extension configured to seal the flow valve piston orifice on the flow valve when the adapter element is engaged with the flow valve, and
   wherein the adapter element is a unitary structure.

16. A kit for a flow control valve, comprising:
   a flow valve having a flow valve fluid inlet, a flow valve fluid outlet and a flow valve piston orifice;
   an adapter element having at least one adapter element fluid inlet and at least one adapter element fluid outlet and configured to be sealingly engaged with and in fluid communication with the flow valve; and
   a plunger mechanism sealingly engaged with and in fluid communication with the adapter element, the plunger mechanism having a plunger element in operable communication with the adapter element fluid outlet,
   wherein the adapter element further comprises a piston orifice plug extension configured to seal the flow valve piston orifice on the flow valve when the adapter element is engaged with the flow valve, and
   wherein the adapter element is a unitary structure.

* * * * *